Sept. 26, 1961 W. KIWI 3,001,346
SECURING APPARATUS
Filed July 2, 1959 7 Sheets-Sheet 1

INVENTOR
Walter Kiwi
BY
ATTORNEY

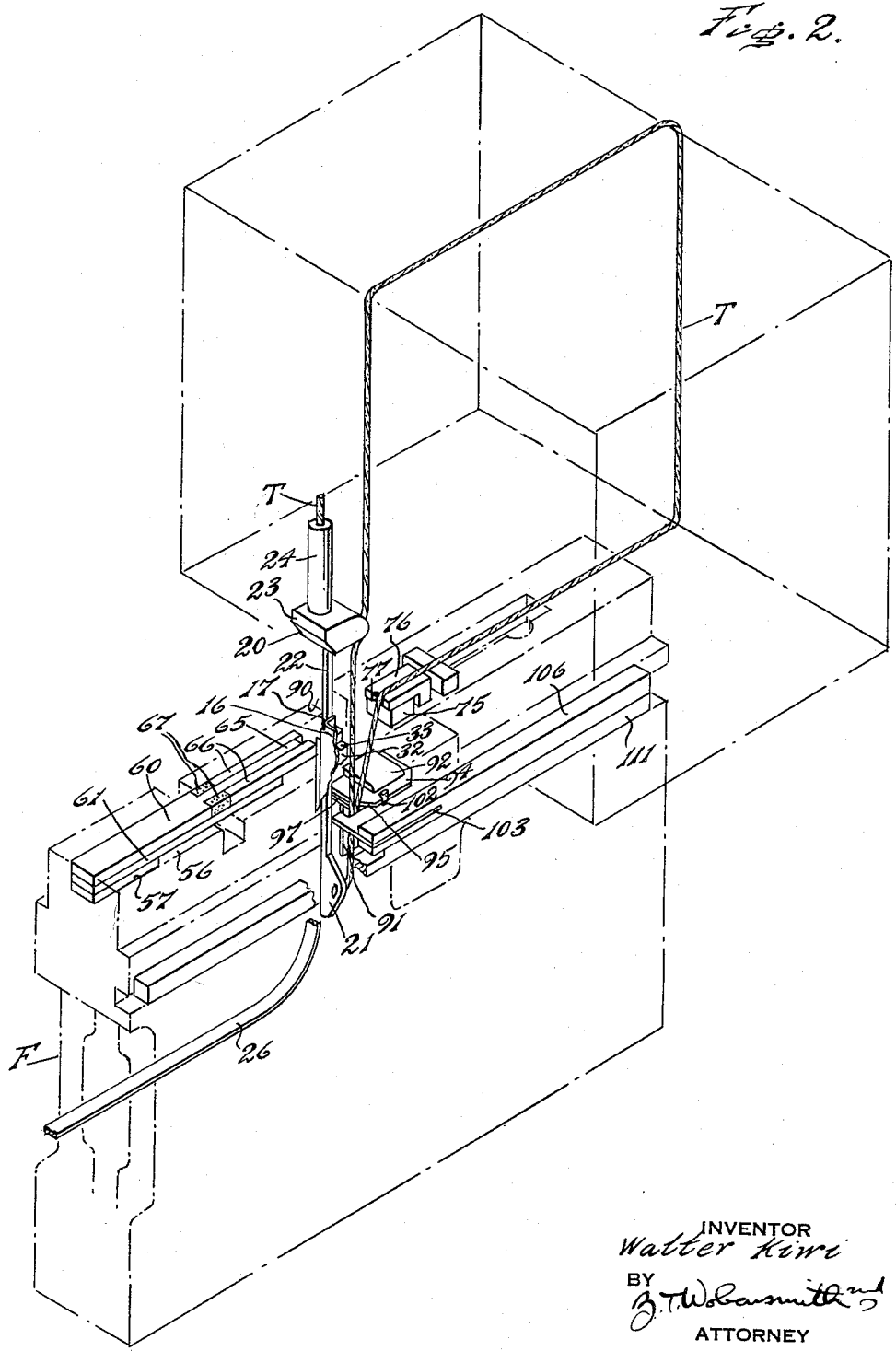

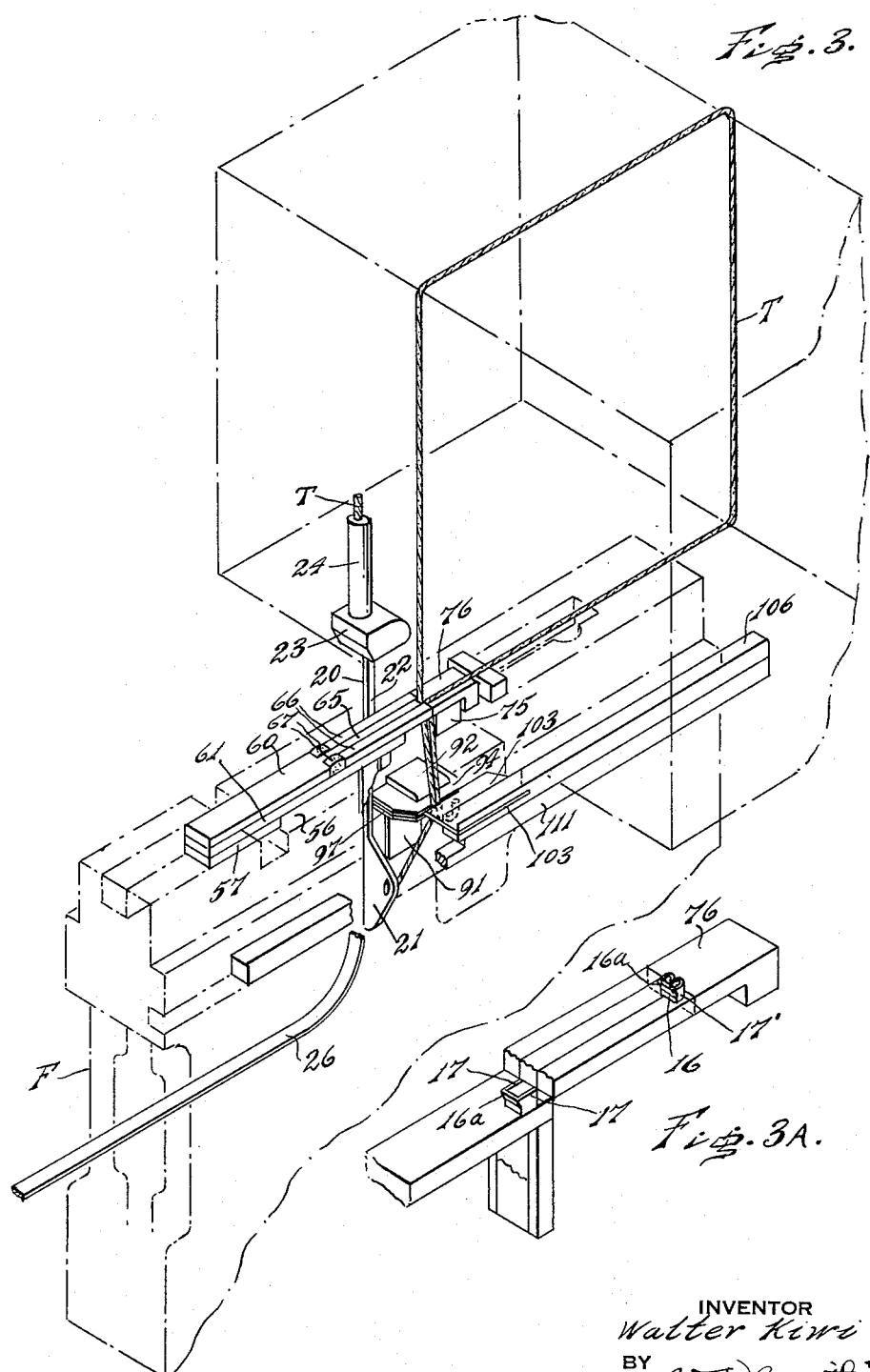

Sept. 26, 1961 W. KIWI 3,001,346
SECURING APPARATUS
Filed July 2, 1959 7 Sheets-Sheet 4
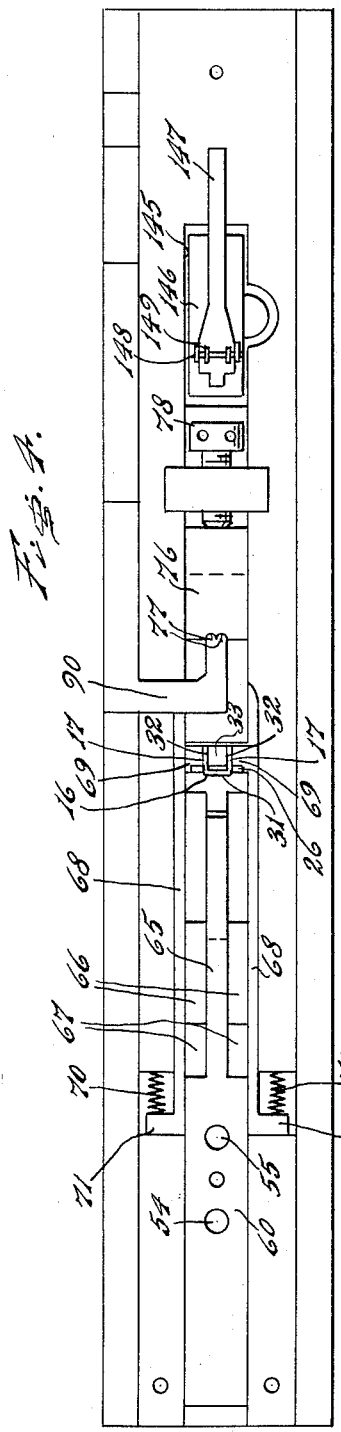
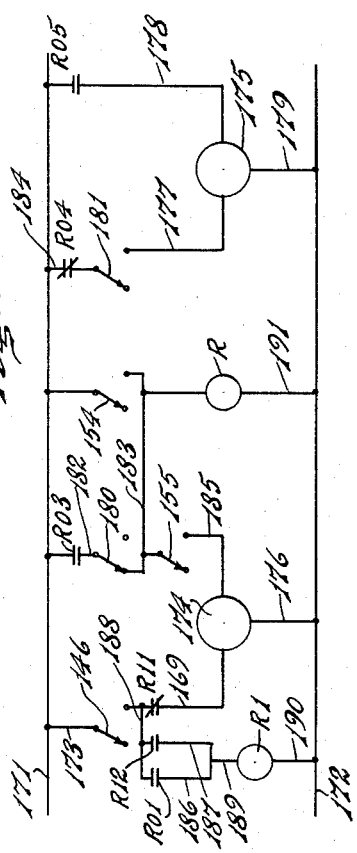
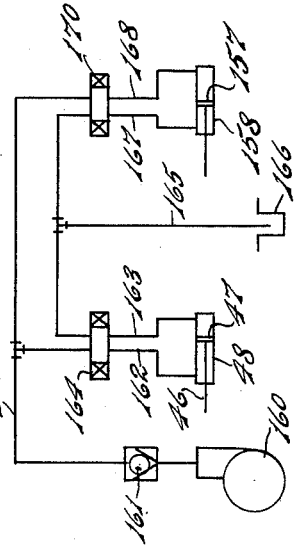
INVENTOR
Walter Kiwi
BY
B.T. Wolcensmith
ATTORNEY

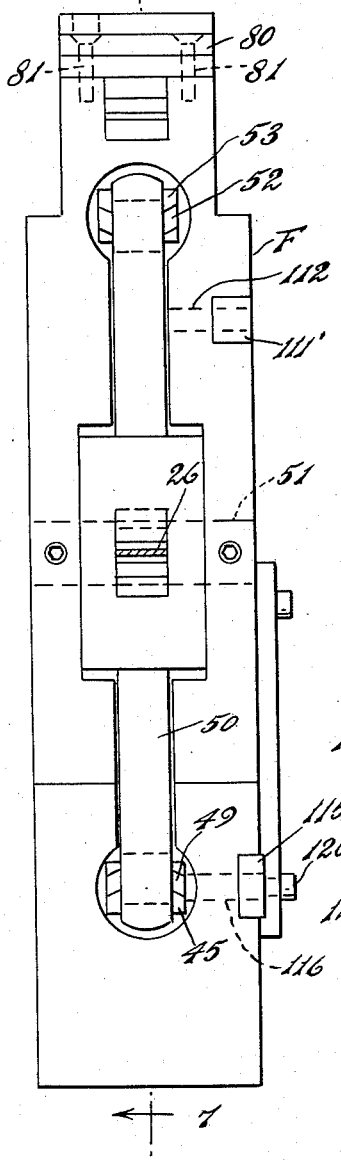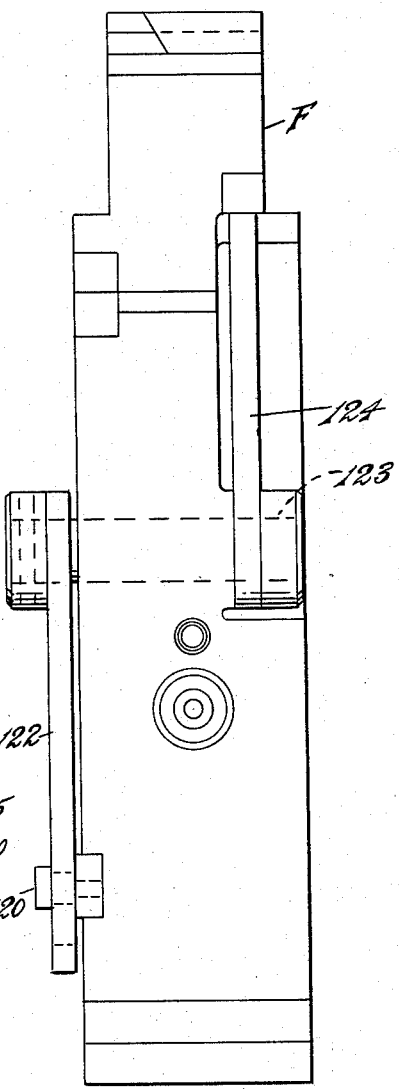

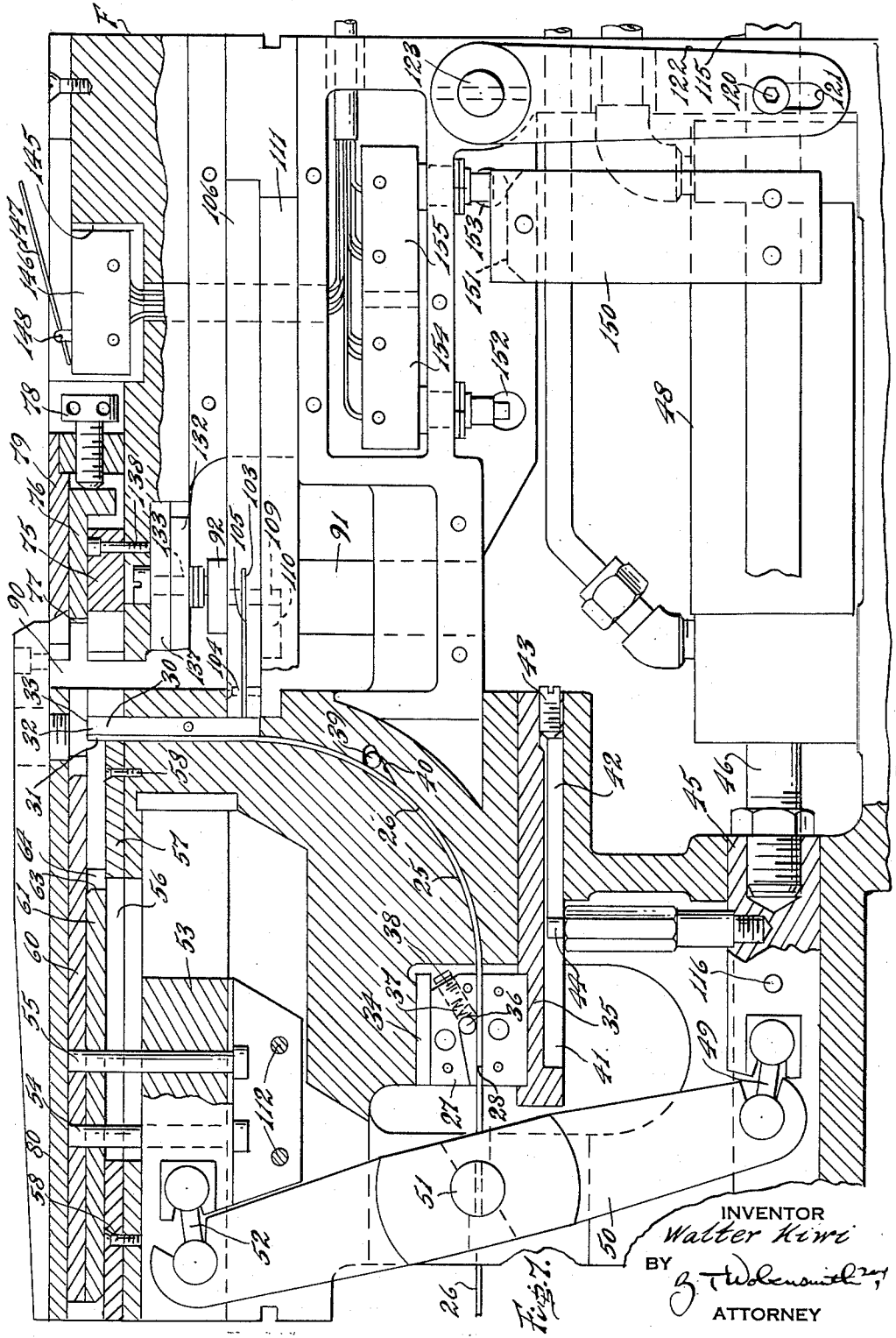

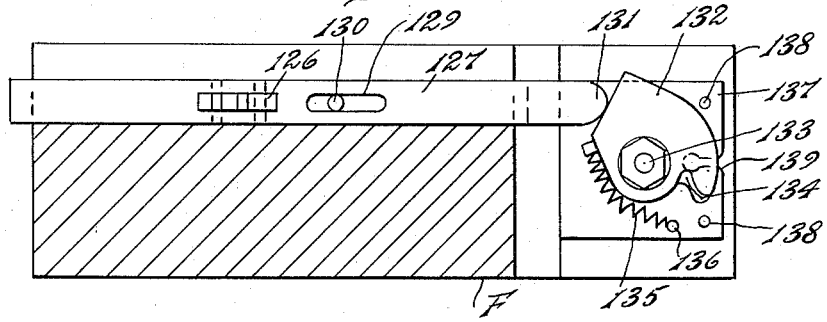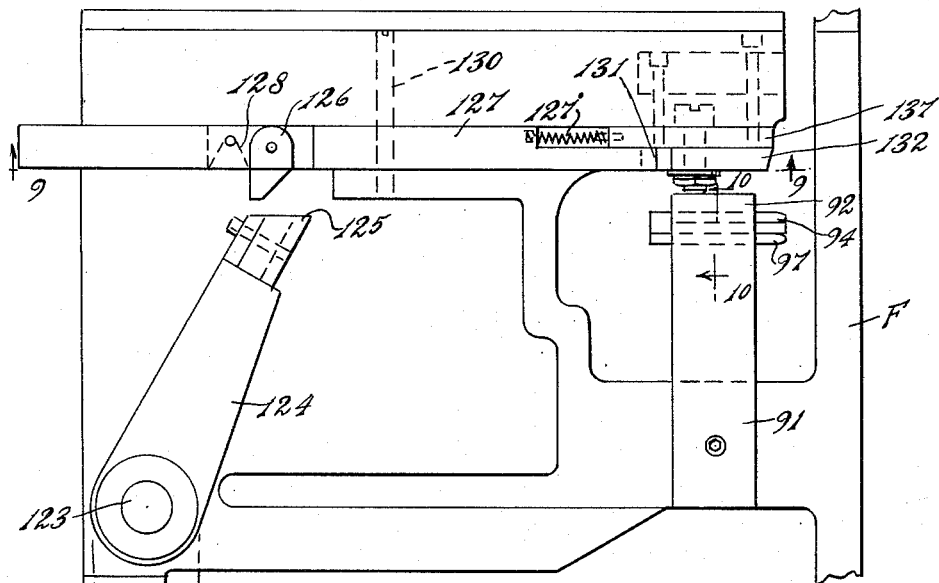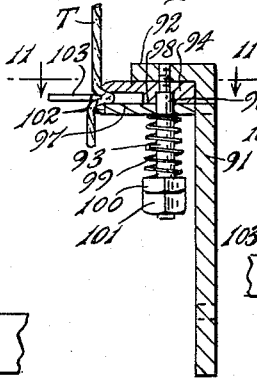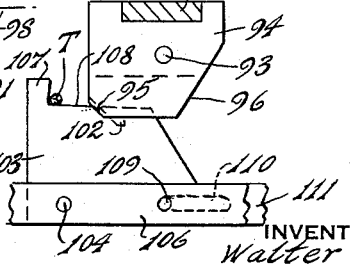
INVENTOR
Walter Kiwi
BY
ATTORNEY

United States Patent Office 3,001,346
Patented Sept. 26, 1961

3,001,346
SECURING APPARATUS
Walter Kiwi, Torresdale Manor, Pa., assignor to R. H. Hood Company, Philadelphia, Pa., a corporation of Pennsylvania
Filed July 2, 1959, Ser. No. 824,610
18 Claims. (Cl. 53—135)

This invention relates to securing apparatus and more particularly to such apparatus in which a cord is placed in surrounding relation to an article, which may be a bundle of flat pieces such as containers in flat unassembled condition, and the cord has its ends secured together by a clip which is formed from metal at the location of application to the cord ends, the cord ends being severed subsequent to the application of the metal band or clip.

It is the principal object of the present invention to provide improved apparatus for applying a cord in surrounding relation to an article, such as a bundle of pieces, and securing the cord, a metal clip being formed and applied in gripping relation to the cord at a convenient location.

It is a further object of the present invention to provide apparatus of the character aforesaid in which simple but effective apparatus is provided for forming and applying a metal clip in gripping relation to cord ends for holding the same.

It is a further object of the present invention to provide improved clip forming apparatus in which metal in strip form is fed to a predetermined location, and in timed relation, is formed into a clip and severed, and is applied in gripping engagement with cord ends.

It is a further object of the present invention to provide cord applying and securing apparatus together with provisions for applying a clip to hold the ends of a cord in fixed relation which can be used for a wide variety of purposes, which is simple and compact in its construction, which is accessible for inspection, maintenance and repair, and which has a long operating life.

It is a further object of the present invention to provide apparatus for applying a cord around a bundle or package, securing the ends of the cord together in holding relation, and improved apparatus of compact character for severing the cord beyond the clip.

It is a further object of the present invention to provide apparatus for applying the cord in surrounding relation to a package or bundle in which the cord is gripped and held in an improved manner.

It is a further object of the present invention to provide package tieing apparatus, which may be used at a plurality of spaced locations for providing multiple ties around a bundle or package.

It is a further object of the present invention to provide cord applying, securing and severing means which may be constructed as a unit and which unit may be moved within a machine as required for the application of a tie at a selected location.

It is a further object of the present invention to provide securing means for articles and the like in which a cord is secured by a clip, which is economical in its use of cord and which can utilize cord of lighter weight than heretofore.

It is a further object of the present invention to provide securing means for articles and the like in which a cord is applied and is secured at a corner of the package so as to permit better stacking and bundling of a plurality of secured bundles.

It is a further object of the present invention to provide securing means for articles in which a cord is applied and is secured at a corner of the package so as to eliminate scratching or tearing of other bundles or of contiguous objects by the securing means.

It is a further object of the present invention to provide securing means for articles in which a cord is applied and is secured at a corner of the package so as to avoid injury to persons handling the package.

It is a further object of the present invention to provide securing means for articles in which a cord is applied and is secured at a corner of the article so that a compact arrangement is ensured.

It is a further object of the present invention to provide apparatus for securing articles together in a bundle which has a wide range of usefulness, particularly for articles of paper, such as newspapers, periodicals, and the like, but which is also useful for other articles of paper or paper board, or for articles of wood, plastic or metal.

Other objects and advantageous features of the invention will be apparent from the description and claims.

The nature and characteristic features of the invention will be more readily understood from the following description, taken in connection with the accompanying drawings forming part thereof, in which:

FIG. 2 is a view similar to FIG. 1 and showing the needle in it downward position, and prior to the application of a clip;

FIG. 3 is a view similar to FIG. 2 with the needle in its downward position, and in position for the application of the metal clip;

FIG. 3A is a fragmentary perspective view showing the forming and clenching of the clip;

FIG. 4 is a top plan view of the clipper assembly with the cover plates removed to show the interior construction of the clip forming and delivering mechanism;

FIG. 5 is an end elevational view of the clipper assembly as seen from the approach end;

FIG. 6 is an end elevational view of the clipper assembly as seen from the opposite or delivery end;

FIG. 7 is a vertical sectional view taken approximately on the line 7—7 of FIG. 5;

FIG. 8 is a fragmentary rear elevational view showing the cord cutting mechanism;

FIG. 9 is a sectional view taken approximately on the line 9—9 of FIG. 8 illustrating the operation of the cutting mechanism;

FIG. 10 is a fragmentary sectional view taken approximately on the line 10—10 of FIG. 8.

FIG. 11 is a horizontal sectional view taken approximately on the line 11—11 of FIG. 10;

FIG. 12 is a diagrammatic view showing the electrical circuits for controlling the operations;

FIG. 13 is a diagrammatic view showing the air or hydraulic circuits for controlling the operations; and FIG. 14 is a perspective view showing a securing clip on the ends of the cord in secured position.

Figure 1:
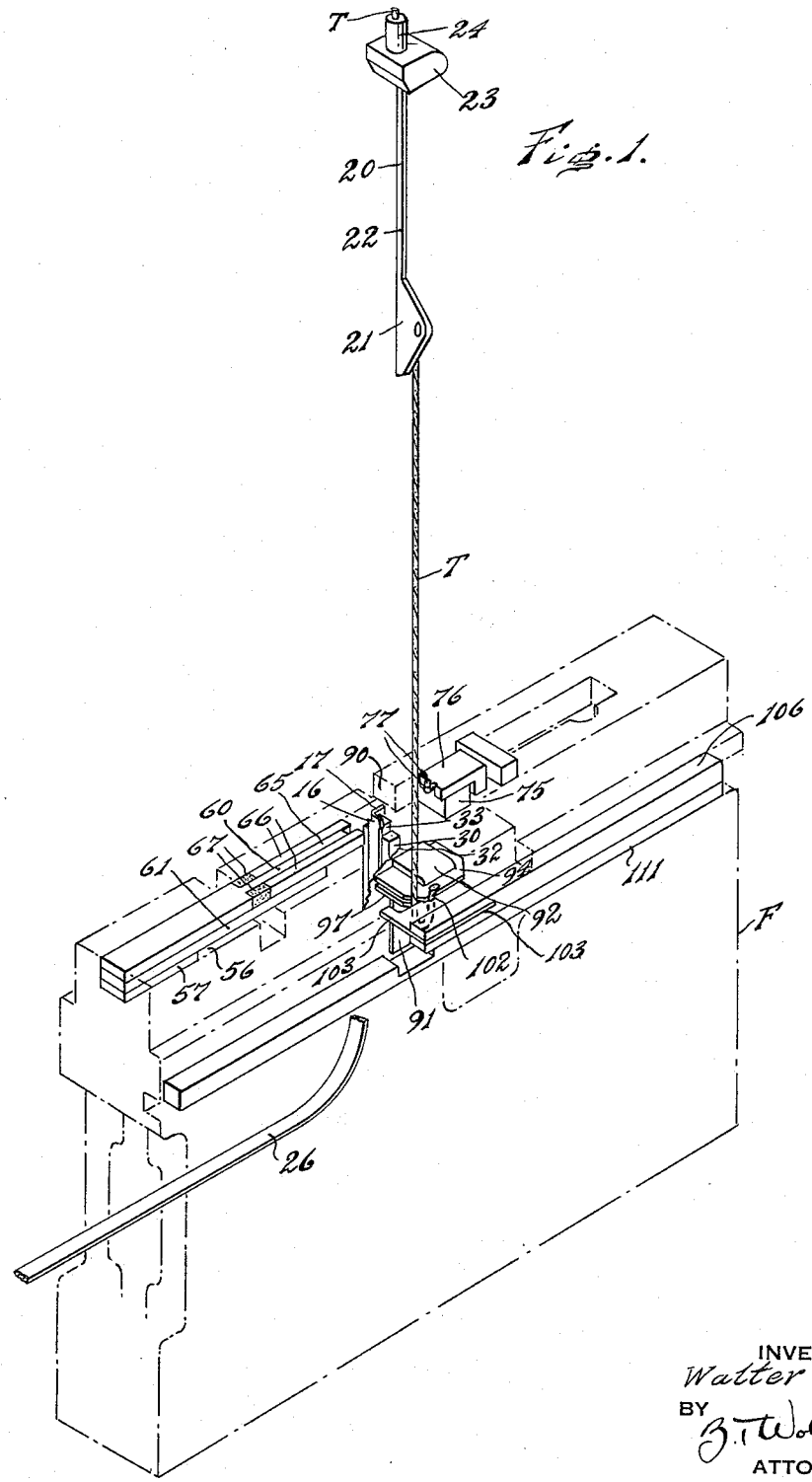
FIGURE 1 is a perspective view of a portion of the apparatus of the present invention with the needle in its upper position for the delivery of a package or bundle to be tied.

It should of course be understood that the description and drawings herein are illustrative merely, and that various modifications and changes can be made in the structure disclosed without departing from the spirit of the invention.

Like numerals refer to like parts throughout the several views.

Referring now more particularly to the drawings, a frame F is provided which carries strip metal feeding, clip forming, cutting off and applying apparatus, cord end receiving and retaining devices, cord severing or cutting mechanism, and actuating mechanism for the foregoing, together with a cord supplying needle for the delivery and positioning of twine or cord T for wrapping.

The clip K as applied to the parallel ends of the cord T, shown particularly in FIGS. 3A and 14, includes a single piece of metal with a back 16 having a slightly flared portion 16a and side arms 17, initially straight and subsequently curled as at 17' in surrounding and gripping engagement with parallel portions of the cord T. The flaring at 16a makes in effect a wedge shaped clip which has an improved holding action with a reduced tendency to cut the cord.

In order to provide a supply of cord positioned as desired, a vertically reciprocable needle 20 is provided. The needle 20 preferably includes an enlarged hollow head 21 with a tube 22 extending upwardly therefrom and carried by a reciprocable needle actuator 23 which also has a hollow tube 24 through which the cord T extends from any suitable source such as a package of twine or cord (not shown) at a convenient elevated location.

The frame F is also provided with an interior guide portion having a guide slot 25 therein extending from a horizontal entrance location to a vertical delivery location. An elongated metal strip 26 is provided from which the clips K are formed and cut, as hereinafter explained.

The metal strip 26 can be stored, preferably in coil form, at any convenient location, and extends to the slot 25. At the entrance to the slot 25 a strip feeder 27 is provided having a slot 28 through which the strip 26 extends. At the upper or exit end of the slot 25 a vertically disposed former die 30 is provided having a central portion with a face 31 for forming the back 16 of the clip K and side faces 32 for formation of the side arms 17 of the clip K, and having an upper face 33 for the shear severing of a partially formed clip K, as hereinafter explained.

The strip feeder 27 is in engagement at the upper portion thereof with a wear plate 34 and at the lower portion thereof is in engagement in a feed slide 35 mounted in the frame F for reciprocation. Within the interior of the strip feeder 27 a wedge roll 36 is provided normally urged into wedging engagement with the metal strip 26 by a spring 37 having an adjustable threaded plug 38 in engagement with one end thereof. The feeder 27 by engagement of the roll 36 with the strip 26 will advance the strip 26 to the right and upwardly as shown in FIGS. 1, 2, 3 and 7, but will slide to the left past the portion of the strip 26 which has been advanced for clip formation and clenching. An auxiliary return preventing wedging roll 39 can also be mounted in a recess 40 within the frame F for preventing backward movement of the strip 26 when the same is not held by the roll 36.

In order to actuate the slide 35 a slot 41 is provided in the lower end thereof within which a bar 42 is mounted adjustably positioned along the slot 41 by an adjusting screw 43, and a head 44 is provided for engagement in the slot 41 with one end of the slot 41 and with the bar 42. The head 44 is mounted in a slide bar 45 slidably mounted in the frame F and connected by a piston rod 46 to an actuating piston 47 in a fluid cylinder 48 carried by the frame F. The rod 46 has pivotally connected at the front end thereof by a link 49, a rocker arm 50 pivotally mounted on a pivot shaft 51 carried by the frame F. The upper end of the rocker arm 50 is connected by a link 52 to an upper slide 53 which is slidably mounted in the frame F.

The slide 53 has actuating pins 54 and 55 extending upwardly therefrom through an opening 56 in the frame F and in a clip die spacer plate 57. The plate 57 is secured to the frame F by screws 58. The pins 54 and 55 extend into actuating engagement with upper and lower clip dies 60 and 61. The upper and lower clip dies 60 and 61 are held together in assembled relation by the pins 54 and 55. The lower clip die 61 has a central portion 63 and side portions 64 for pressing the strip 26 against the former die 30 and bending the sides 17 of the strip 26 to U-shaped positions for clip formation. The upper die plate 60 has a central portion 65 for cutting off the central portion 16 of the previously formed clip K by a shearing action across the top face 33 of the former die 30. The die 60 also has side bars 66 movable along the sides 17 of the clip K for retaining the sides 17 of the clip K in position for engaging the cord T, as hereinafter explained. Resilient inserts 67 can be provided between the ends of the side bars 66 for permitting limited longitudinal movement thereof. Supporting bars 68 are provided slidably mounted in the frame F (see FIG. 4) and have upper faces 69 supporting the sides 17 of the clip K as it is advanced for clenching. Springs 70 abutting against outward projections 71 permit the forward and return movement of the supporting bars 68 as required.

The frame F in spaced relation to the former die 30 has a curling die supporting plate 75 mounted thereon with a curling die 76 resting thereon. The curling die 76 has curved end face portions 77 for guiding the ends 17 of the clip K towards each other and in curled relation to parallel portions of the cord T. An adjusting screw 78 is provided for engaging the rear end of the curling die 76 for positioning the die 76 and taking up wear. Above the curling die 76 an upper die cover plate 79 is provided, and above the upper die plate 60 spaced die cover plates 80 are provided and secured in fixed position by studs 81.

The frame F has an opening 90 therein for the reception of the needle head 21 upon its downward movement. Structure is provided for retaining the cord T after severing so that the needle 20 may be impelled upwardly to provide a cord for the next binding operation. The holding structure preferably includes a post 91 rectangular in cross section carried by the frame F and having an upper horizontal head portion 92 integral therewith. The head portion 92 has a downwardly extending guide pin 93 mounted thereon. An upper gripping plate 94 slidably mounted on the pin 93 and guided by the post 91 has a forward inclined face 95 and a rearward inclined face 96. A lower gripping plate 97 is provided slidably mounted on the pin 93 and guided by the post 91. The upper gripping plate 94 has a downwardly extending portion 98 for spacing the lower gripping plate 97. The pin 93 has an adjustable compression spring 99 thereon in engagement at one end with the lower plate 97 and at the other end with an adjusting nut 100 for controlling the force applied against the lower plate 97. A lock nut 101 can also be provided for holding the nut 100.

The spring 99 retains the plates 94 and 97 against separation and restrains the lower plate 97 against downward movement. The lower plate 97 is similar in shape to the upper plate 94 except that it is also provided with a retaining hook 102 extending transversely therefrom.

In order to move a cord T into position for gripping by the plates 94 and 97, a cord directing plate 103 is provided held by a screw 104 in a slot 105 in a slidable actuating bar 106. The plate 103 has an extension 107 providing a hook for engagement by the cord T and an edge 108 in slightly converging relation to the actuating bar 106. The actuating bar 106 has a downwardly extending driving pin 109 which is engageable in an elongated slot 110 in an operating bar 111, the operating bar 111 being connected through an offset portion 111' and pins 112 to the upper slide 53 for oscillating movement therewith.

The slide bar 45 has a control bar 115 connected thereto by a pin 116 for movement therewith. The bar 115 has a driving stud 120 connected thereto in engagement with a slot 121 in a lever 122. The lever 122 is keyed to a shaft 123 which extends through the frame F.

On the opposite end of the shaft 123 a cutter actuating lever 124 is mounted. The cutter actuating lever 124 has an actuating finger 125 on the upper end thereof for engagement with a downwardly projecting finger 126 on a cutter operating slide 127 normally urged to the left as shown in FIG. 8 by a spring 127', the finger 126 having a spring 128 normally urging the same to downward position for advancing movement of the slide 127 upon engagement of the finger 125 therewith, but for permitting turning movement against the force of the spring 128 to permit the finger 125 to clear the finger 126 upon return movement. The slide 127 has a slot 129 through which a stop pin 130 extends, and the slide 127 has an end portion 131 for engagement with a movable cutter 132. The cutter 132 is supported on a stud 133 and has a cutting edge 134. A spring 135 connected to the cutter 132 and to a fixed pin 136 normally urges the cutter 132 to out of cutting position.

A shear plate 137 is provided removably mounted above the movable cutter 132 and held by studs 138 in the frame F in engagement therewith. The shear plate 137 has a slot 139 therein into which the parallel cords T are urged, as hereinafter explained, for severing by the cutting edge 134 moving thereacross.

The frame F also has an opening 145 therein within which a switch 146 is provided having an operating arm 147 pivotally mounted by a pivot pin 148 and normally urged to upward position by a spring 149. The arm 147 upon downward movement is adapted to actuate the switch 146 for initiating the cycle, including needle movement, metal strip feed, clip formation and cut off, clip delivery and curling and cord end cut off, as hereinafter explained.

While any suitable control mechanism may be employed, one suitable mechanism is shown schematically in FIG. 12 which shows the electrical connections and in FIG. 13 which shows schematically the fluid connections for cylinder operation.

The control bar 115 has a cam plate 150 having a cam 151 carried thereby for respective engagement with actuators 152 and 153 of limit switches 154 and 155.

The actuating and control mechanism for a piston 157 in the needle control cylinder 158 for actuating the needle 20 and for actuating the piston 47 in the clipper control cylinder 48 is diagrammatically illustrated in FIGS. 12 and 13.

As shown in FIG. 13, a source of fluid under pressure is employed which can be a pump 160 to provide a source of liquid under pressure for delivery through a check valve 161 in a fluid connection 159. Fluid connections 162 and 163 to the opposite ends of the cylinder 48 for operating the piston 47 have a two way two position valve 164 connected thereto. A connection 165 to a reservoir 166 for supplying the pump 160 is also provided.

In a similar manner fluid connections 167 and 168 are provided communicating with the cylinder 158 and controlled by a two way two position valve 170 for the supply and exhaust of liquid under pressure from the source 160 and to the reservoir 166.

Referring now to FIG. 12 the electrical circuits for controlling the fluid system are shown and include power leads 171 and 172 with a conductor 173 leading to a normally open track switch 146 operated by the depression of the finger 147 to a position to energize the needle solenoid 174.

The energization of the needle solenoid 174 is effective through a conductor 169 and normally closed contacts R11 of the relay R1 and a conductor 176 connected to the power lead 172.

Energization of the solenoid 174 in turn actuates the valve 170 to move the piston 157 in the cylinder 158 for downward movement of the needle 20. A solenoid 175 is provided for controlling the valve 164 and has conductors 177, 178 and 179 connected thereto.

Needle position responsive switches 180 and 181 are provided. The switch 180 is operated at the upper position and the switch 181 at the lower position of the needle 20. The switch 180 is connected to the conductor 182 which is connected to the lead 171 and has a conductor 183 to which it connects and the switch 181 has a conductor 184 which is connected to the lead 171 leading thereto. A conductor 185 connects the solenoid 174 for energization by the switch 154.

Relays R and R1 are provided, the relay R having a normally open contact R03 in the conductor 182 in series with the needle upper limit switch 180, a normally open contact R05 in the conductor 178 in series with the clipper solenoid 175, a normally closed contact R04 in the conductor 184 in series with the needle lower limit switch 181 and a normally open contact R01 in a conductor 186 in series with the relay R1 and to which a conductor 188 is connected. The relay R1 has a normally open contact R12 in a conductor 187 parallel to the contact R01 and a normally closed contact R11 in the conductor 169 in series with the needle solenoid 174. The conductors 186 and 187 are connected to a conductor 189 leading to the relay R1 and the relay R1 is connected by a conductor 190 to the power lead 172.

The mode of operation will now be pointed out.

At the beginning and before an operating cycle is commenced an end portion of the cord T will be gripped and held between the gripping plates 97 and 94, and the needle 20 will be in elevated position with cord T supplied therethrough from the source.

A vertical run of cord T will be available as shown in FIG. 1, and after a bundle or other article to be secured is moved thereagainst additional cord will be withdrawn from the supply through the needle 20 to extend below, in front of, and across the top of the bundle or article to be secured.

The electrical circuit conditions prevailing at the time are illustrated in FIG. 12.

Initiation of operations is effected by the advance of a bundle into engagement with the cord T and with the needle 20 in its upper position. The advance of the article is effective to depress the arm 147 to operate the switch arm 146 to complete an energizing circuit for the needle solenoid 174 to actuate the needle piston 157 in the needle cylinder 158 to impel the needle 20 downward. This energizing circuit can be traced from the power lead 171 through the conductor 173, the closed contacts of the switch 146, the conductor 188, the normally closed contacts R11 of the relay R1, the conductor 169, the solenoid 174, and the conductor 176 to the power lead 172.

The downward movement of the needle 20 advances the head 21 to a position in the opening 90 and brings the cord in back of the article as illustrated in FIG. 2.

Upon the downward movement of the needle 20 the needle actuator 23 urges the cord T into engagement with the article thereby reducing the slack and permitting of securing of the cord T in tight condition on the finished bundle, and at a corner thereof.

It will be noted that during the downward movement of the needle 20 the dies 60 and 61 are in retracted position. When the needle head 21 is in its lowermost position the needle lower position switch 181 is moved to a position to complete an energizing circuit for the clipper solenoid 175 which can be traced as follows: from the power lead 171, through the conductor 184, the normally closed contacts R04, the closed contacts of the switch 181, the conductor 177, the solenoid 175 and the conductor 179 to the power lead 172.

The clipper solenoid 175 is thus actuated to apply fluid pressure to move the piston 47 to the left as shown in FIGS. 7 and 13 to thereby move the piston rod 46 to actuate the rocker arm 50.

As the rocker arm 50 is thus moved, the head 44 is moved to retract the strip feeder 27 to a position for subsequent advance movement upon the return of the rocker arm 50 and is effective for moving the upper slide 53. Movement of the slide 53 through the pins 54 and 55 moves the lower die 61 to a position to move the side faces 64 thereof to form the side arms 17 of the clip K and simultaneously cut off by advance of the upper die 60 across the face 63 a previously formed but unsevered clip K. As the clip K is severed it is supported by the upper faces 69 of the supporting bars 68 which advance therewith to move the die to a clenching position as directed by the faces 77 of the die 76.

As the dies 60 and 61 are advanced, the operating bar 111 is also simultaneously moved to the right as shown in FIG. 7, and by its lost motion connection through the pin 109 and slot 110 moves the bar 106 and the cord directing plate 103 carried thereby to bring the portion of the cord T moved downwardly by the needle head 21 into a position parallel to the end of the cord T held by the gripper plates 97 and 94. The finger 102 prevents retraction upon subsequent return of the cord directing plate 103. After the cord ends have been brought together and the clip K has been clenched therearound, the arm 124 by its advance and engagement of its finger 125 with the finger 126 moves the bar 127 to a position such that the movable cutter 132 severs the parallel ends beyond the clenched clip K in engagement therewith.

It will be noted that an end of the cord is still retained by the gripping plates 97 and 94 so that upon the subsequent upward movement of the needle 20, a run of cord will be available as before and as shown in FIG. 1, for the next oncoming article.

The movement of the piston 47 in the cylinder 48 is effective for energizing the switch 154 to cause a return movement of the piston 47 to restore the bar 127 to its initial position and to restore the dies 60 and 61 to their initial positions.

It will be noted that upon closing of the contacts of the switch 154, the relay R will be energized through a circuit which can be traced as follows: from the power lead 171 through the closed contacts of the switch 154, the conductor 183, to the relay R and through a conductor 191 to the power lead 172.

Energization of the relay R is effective for de-energizing the contacts R04, energizing the contacts R05 and causing actuation of the clipper solenoid 175 for moving the valves 164 in the opposite direction to return the piston 47 to its initial position. The energization of the relay R is also effective for setting up a circuit to energize the relay R1 through a circuit which can be traced from the power leads 171, through the conductor 173, the closed contacts of the track switch 146, the conductor 188, the conductors 186 and 189, the relay R1, and the conductor 190 to the power lead 172.

Energization of the relay R1 is effective for energizing the holding contacts R12 so that the relay R1 is energized. The energization of the relay R1 de-energizes the contacts R11. Upon initiation of the return of the piston 47 the contacts of the switch 154 are opened and upon the completion of the return of the piston 47 the switch 155 is actuated to set up a circuit which may be traced from the power lead 171 through the closed contacts R03, the switch 180 in closed position, the switch 155 in closed position, the conductor 185, the solenoid 174, and the conductor 176 to the power lead 172.

Energization of the solenoid 174 is effective for changing the position of the valves 170 to effect a return of the needle 20 to its upper position.

When the needle 20 moves to its upper position the switch 180 will be moved to an open position so that the relay R is deenergized.

The article in secured condition is removed and the cycle can then be repeated as desired.

If the article is not removed from engagement with the finger 147 of the switch 146 the relay R1 will remain in energized condition so that the contacts R11 are held in open condition to prevent a repetition of the cycle until the switch 146 is deenergized so that the relay R1 is also deenergized.

As a result of the successive introduction of portions of the cord T into gripped engagement between the upper gripping plate 94 and the lower gripping plate 97 by the hook 102 of the cord directing plate 103, small U-shaped loops of cord will be retained and urged by additional loops for successive discharge at the rearward faces of the plates 94 and 97. This will represent only a very small amount of waste as compared with cords joined by knots, and the saving of material by the use of the clips K more than compensates for the excess material required with knots.

I claim:

1. Securing apparatus for applying and securing a cord in encircling relation to an article comprising a frame, a supply of strip material, members in said frame for forming a portion of said strip material into a U-shaped form and severing the same from the strip, cord end holding members below said forming members, a needle guiding and holding the cord and advancing the cord to a position for engagement by said holding members, members for forming the severed strip material into a clip in gripping engagement with parallel cords, and a cord severing device interposed between said holding members and said clip forming members for severing parallel portions of the cord beyond the clip.

2. Securing apparatus for applying and securing cord in encircling relation to an article comprising a frame, a supply of strip material, members for forming a portion of said strip material into a U-shaped form and severing the same from the strip, cord end holding members below said forming members, a reciprocable needle holding a portion of cord for advancement of an article thereagainst and guiding the cord across the top and down the side of the article to a position for engagement by said holding members, members for forming the severed strip material into a clip in gripping engagement with parallel cords at a corner of said article, and a cord severing device interposed betwen said holding members and said clip forming members for severing parallel portions of the cord beyond the clip.

3. Securing apparatus as defined in claim 2 in which said clip forming members are positioned to locate the clip at a corner of the article.

4. Securing apparatus for applying and securing a cord in encircling relation to an article comprising a frame, members in said frame for applying the cord to the article with parallel ends extending therefrom, a supply of material in strip form, members for forming clips from said strip and applying said clips to parallel cord portions including a first die member having a vertically extending face and vertical side faces extending therefrom, a second die member horizontally movable with respect to said first die member and having portions for forming said strip into U-shape and portions for severing said formed strip, and an additional die member for curling the free ends of the formed strip into gripping engagement with parallel cord portions, and members for actuating said second die member in timed relation.

5. Securing apparatus as defined in claim 4 in which strip feed members are provided in said frame and members are provided for actuating said strip feed members for advancing said strip upon return movement of said second die member.

6. Securing apparatus as defined in claim 4 in which said first die member is fixedly mounted in said frame and the said portions for forming and said portions for severing of said second die member are movable together, and said additional die member is adjustably mounted in said frame.

7. Securing apparatus as defined in claim 4 in which said first die member is fixedly mounted in said frame and said portions for forming and said portions for severing of said second die member are movable together, and at least one of said portions of said second die member has an upwardly flared face for forming a portion of said clip into funnel shape.

8. Securing apparatus as defined in claim 4 in which a reciprocable slide is provided in said frame having pins extending upwardly therefrom, and said portions for forming and said portions for severing of said second die member are mounted on said pins for movement together.

9. Securing apparatus as defined in claim 4 in which clip supporting members are provided for supporting said clip for advance of said clip to said additional die member.

10. Securing apparatus for applying and securing cord in encircling relation to an article comprising members for applying the cord to the article with parallel ends extending therefrom, a supply of material in strip form, members for advancing said material for clip formation, members for forming a clip and severing and applying the clip from said strip onto parallel cord portions including a first fixedly mounted die member having a vertically extending face and vertical side faces extending therefrom, a second die member horizontally movable with respect to said first die member and having portions for forming a part of said strip into U-shape, and portions for severing said formed strip part, and additional die portions for curling the free ends of the formed strip part into gripping engagement with parallel cord portions, and members for advancing and retracting said second die member in timed relation to the movement of the members for advancing said material.

11. Securing apparatus for applying and securing a cord in encircling relation to an article comprising cord end holding means for retaining a lower end of the cord in gripped position, reciprocable needle means for guiding and holding the cord and advancing the cord to a position for engagement by said holding means, a member for impelling the cord for gripping engagement by said holding means, and members for securing parallel portions of said cord in gripped relation.

12. Securing apparatus as defined in claim 11 in which said holding means includes gripping plates one of which is resiliently urged towards the other.

13. Securing apparatus as defined in claim 11 in which said cord impelling member includes a reciprocating device having a hook thereon for moving the cord into engagement with said holding means.

14. Securing apparatus for applying and securing cord in encircling relation to an article comprising holding means for retaining a lower end of the cord in gripped position, needle means for controlling the positioning of the cord with respect to the article, said holding means including gripping plates one of which is resiliently urged towards the other, a member for impelling a cord for gripping engagement between said plates including a reciprocating device having a hook thereon for moving the cord between said plates for gripping therein, and members for securing parallel portions of said cord in gripped relationship.

15. Securing apparatus for applying and securing a cord in encircling relation to an article comprising a frame, a supply of strip material, members for advancing the strip material in predetermined timed relation, members for forming a portion of said strip material into a clip and applying the clip to parallel cords, cord end holding members to which the cord is brought in gripped relation in predetermined timed relation, a needle reciprocable with respect to said frame guiding and holding the cord and advancing the cord interiorly of said frame to a position for engagement by said holding members, a cord severing device for severing parallel portions of the cord beyond the clip and subsequent to the application of the clip, and a member for initiating a cord applying cycle.

16. Securing apparatus for applying and securing a cord in encircling relation to an article comprising a frame, a reciprocable motor element in said frame, a supply of strip material, members connected to said motor element for advancing the strip material in predetermined timed relation, members connected to said motor element for forming a portion of said strip material into a clip and applying the clip to parallel cords, cord end holding members connected to said motor element to which the cord is brought in holding relation in predetermined timed relation, a needle reciprocable with respect to said frame guiding and holding the cord and advancing the cord to a position interiorly of said frame for engagement by said holding members, a cord severing device connected to said motor element for severing parallel portions of the cord beyond the clip and subsequent to the application of the clip, and a member carried by said frame for initiating a cord applying cycle.

17. Securing apparatus for applying and securing a cord in encircling relation to an article comprising a frame, a reciprocable motor element in said frame having a rod extending therefrom, a first lever connected to said rod, a second lever connected to said rod, a supply of strip material, members connected to said rod for advancing the strip material in predetermined timed relation, members connected to said first lever for forming a portion of said strip material into a clip and applying the clip to parallel cords, cord end holding members connected to said first lever to which the cord is brought in held relation in predetermined timed relation, a needle reciprocable with respect to said frame guiding and holding the cord and advancing the cord interiorly of said frame to a position for engagement by said holding members, a cord severing device connected to said second lever through a lost motion connection for severing parallel portions of the cord beyond the clip and subsequent to the application of the clip, and a member for initiating a cord applying and securing cycle.

18. Securing apparatus as defined in claim 17 in which said cord end holding members are connected to said first lever through a lost motion connection.

References Cited in the file of this patent

UNITED STATES PATENTS 1,182,602    Tuohy  ---------------- May 9, 1916